(12) United States Patent
Bunker

(10) Patent No.: US 8,672,613 B2
(45) Date of Patent: Mar. 18, 2014

(54) COMPONENTS WITH CONFORMAL CURVED FILM HOLES AND METHODS OF MANUFACTURE

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 762 days.

(21) Appl. No.: 12/872,559

(22) Filed: Aug. 31, 2010

(65) Prior Publication Data
US 2012/0051941 A1 Mar. 1, 2012

(51) Int. Cl.
*F01D 5/18* (2006.01)

(52) U.S. Cl.
USPC ........ 415/115; 29/557; 29/889.721; 416/97 R

(58) Field of Classification Search
USPC ...... 415/115, 116; 416/95, 96 A, 96 R, 97 A, 416/97 R; 29/557, 889.721
See application file for complete search history.

(56) References Cited

U.S. PATENT DOCUMENTS

| | | | |
|---|---|---|---|
| 4,664,597 A | 5/1987 | Auxier et al. | |
| 4,669,957 A | 6/1987 | Phillips et al. | |
| 4,676,719 A | 6/1987 | Auxier et al. | |
| 4,684,323 A | 8/1987 | Field | |
| 4,705,455 A | 11/1987 | Sahm et al. | |
| 4,726,735 A | 2/1988 | Field et al. | |
| 4,738,588 A | 4/1988 | Field | |
| 5,062,768 A * | 11/1991 | Marriage | 416/97 R |
| 5,382,133 A | 1/1995 | Moore et al. | |
| 5,419,681 A | 5/1995 | Lee | |
| 5,458,461 A | 10/1995 | Lee et al. | |
| 5,651,662 A | 7/1997 | Lee et al. | |
| 6,099,251 A * | 8/2000 | LaFleur | 416/97 R |

(Continued)

FOREIGN PATENT DOCUMENTS

JP 2012202280 A * 10/2012

OTHER PUBLICATIONS

Co-pending U.S. Appl. No. 12/562,528, filed Sep. 18, 2009 entitled "Curved Electrode and Electrochemical Machining Method and Assembly Employing the Same".

(Continued)

*Primary Examiner* — Edward Look
*Assistant Examiner* — Christopher R Legendre
(74) *Attorney, Agent, or Firm* — Scott J. Asmus

(57) ABSTRACT

A component is provided and comprises at least one wall comprising a first and a second surface. At least one film cooling hole extends through the wall between the first and second surfaces and has an exit region at the second surface. The second surface has a non-planar curvature in the vicinity of the exit region. The film cooling hole is tapered at the exit region, such that the curvature of the film cooling hole in the exit region conforms to the non-planar curvature of the second surface, thereby forming a curved exit region. A method is also provided for forming at least one film cooling hole in the component. The method includes forming a straight section in the component wall, such that the straight section extends through the first surface, and tapering the film cooling hole, such that the curvature of the film cooling hole in the exit region conforms to the non-planar curvature of the second surface, thereby forming a curved exit region for the film cooling hole.

2 Claims, 9 Drawing Sheets

(56) References Cited

U.S. PATENT DOCUMENTS

| | | |
|---|---|---|
| 6,183,199 B1 | 2/2001 | Beeck et al. |
| 6,234,755 B1 | 5/2001 | Bunker et al. |
| 6,241,468 B1 * | 6/2001 | Lock et al. .................... 415/115 |
| 6,368,060 B1 * | 4/2002 | Fehrenbach et al. ......... 416/97 R |
| 6,383,602 B1 * | 5/2002 | Fric et al. ...................... 428/131 |
| 6,629,817 B2 * | 10/2003 | Shelton et al. ................ 415/115 |
| 6,969,817 B2 | 11/2005 | Lee et al. |
| 7,246,992 B2 * | 7/2007 | Lee ................................ 415/115 |
| 7,328,580 B2 * | 2/2008 | Lee et al. ........................ 60/752 |
| 7,887,294 B1 * | 2/2011 | Liang ........................... 416/97 R |
| 7,997,868 B1 * | 8/2011 | Liang ........................... 416/97 R |
| 8,066,484 B1 * | 11/2011 | Liang ........................... 416/97 R |
| 8,092,176 B2 * | 1/2012 | Liang ........................... 416/96 R |
| 2002/0090295 A1 | 7/2002 | Torii et al. |
| 2002/0172596 A1 | 11/2002 | Kohli et al. |
| 2003/0007864 A1 * | 1/2003 | Shelton et al. ................ 415/115 |
| 2003/0152460 A1 | 8/2003 | Haselbach |
| 2005/0042074 A1 * | 2/2005 | Liang ............................ 415/115 |
| 2005/0220618 A1 | 10/2005 | Zhang et al. |
| 2012/0051941 A1 * | 3/2012 | Bunker ........................ 416/97 R |

OTHER PUBLICATIONS

Co-pending U.S. Appl. No. 12/697,005, filed Jan. 29, 2010, entitled "Process and System for Forming Shaped Air Holes".

Co-pending U.S. Appl. No. 12/790,675, filed May 28, 2010, entitled "Articles Which Include Chevron Film Cooling Holes, and Related Processes".

Co-pending U.S. Appl. No. 12/435,547, filed May 5, 2009 entitled "System and Method for Improved Film Cooling".

* cited by examiner

COMPONENTS WITH CONFORMAL CURVED FILM HOLES AND METHODS OF MANUFACTURE

BACKGROUND

The invention relates generally to gas turbine engines, and, more specifically, to film cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. In addition, all of these components typically include common rows of film cooling holes.

A typical film cooling hole is a cylindrical bore inclined at a shallow angle through the heated wall for discharging a film of cooling air along the external surface of the wall to provide thermal insulation against the hot combustion gases which flow thereover during operation. The film is discharged at a shallow angle over the wall outer surface to minimize the likelihood of undesirable blow-off thereof, which would lead to flow separation and a loss of the film cooling effectiveness. Film cooling holes are typically arranged in rows of closely spaced apart holes, which collectively provide a large area cooling air blanket over the external surface. However, the more holes required to provide full-surface coverage of the film cooling boundary layer, the more air is also required, thereby decreasing engine efficiency.

At present, film cooling holes formed in hot gas path components utilize straight holes and straight facet features. For example, diffuser shaped holes 2 are made with straight round holes 4 and a straight shaped exit footprint 6 at a differing angle. FIGS. 1-4 schematically illustrate prior art diffuser film cooling holes. FIGS. 1 and 2 depict a prior art laid back fan diffuser film cooling hole, where D is the diameter of the straight round hole 4, $L_T$ is the length of the straight round hole 4, L is the entire length of the diffuser film cooling hole, δ is the angle between an inboard surface 5 of the exit portion 6 of the diffuser and a centerline 7, and α is the angle between the centerline 7 and a straight outer surface 8 of the film cooled wall 3. Referring to FIG. 2, β is the angle between the centerline 7 and the inboard surface 5 of the exit portion 6 of the diffuser film cooling hole. As can be seen in FIGS. 1 and 2, the prior art laid back fan diffuser film cooling hole uses straight surface facets in the direction of the film hole and flow. Similarly, FIGS. 3 and 4 schematically depict a prior art fan diffuser film cooling hole (also indicated by reference numeral 2), and the same reference numerals are used to indicate the corresponding features in FIGS. 1-4. As can be seen in FIGS. 3 and 4, the prior art fan diffuser film cooling hole also uses straight surface facets in the direction of the film hole and flow. The conventional fan diffuser cooling holes shown in FIGS. 1-4 are typically formed by electric discharge machining (EDM) with conventional electrodes.

These straight surface facets lead to high injection angles and significant film blow-off for conventional film cooling holes with exit portions on curved surfaces of the hot gas path component. It would therefore be desirable to provide film cooling holes with reduced film-blow-off for use in hot gas path components with film cooled curved surfaces.

BRIEF DESCRIPTION OF THE INVENTION

One aspect of the present invention resides in a component comprising at least one wall comprising a first surface and a second surface. At least one film cooling hole extends through the wall between the first and second surfaces and has an exit region at the second surface of the component wall. The second surface of the component wall has a non-planar curvature in the vicinity of the exit region. The film cooling hole is tapered at the exit region, such that the curvature of the film cooling hole in the exit region conforms to the non-planar curvature of the second surface of the component wall thereby forming a curved exit region.

Another aspect of the invention resides in a method of forming at least one film cooling hole in a component having at least one wall comprising a first surface and a second surface. The second surface has a non-planar curvature in the vicinity of the exit region of the film cooling hole. The method comprises forming a straight section in the component wall, such that the straight section extends through the first surface of the component wall, and tapering the film cooling hole, such that the curvature of the film cooling hole in the exit region conforms to the non-planar curvature of the second surface of the component wall, thereby forming a curved exit region for the film cooling hole.

DRAWINGS

These and other features, aspects, and advantages of the present invention will become better understood when the following detailed description is read with reference to the accompanying drawings in which like characters represent like parts throughout the drawings, wherein.

Figure 1:
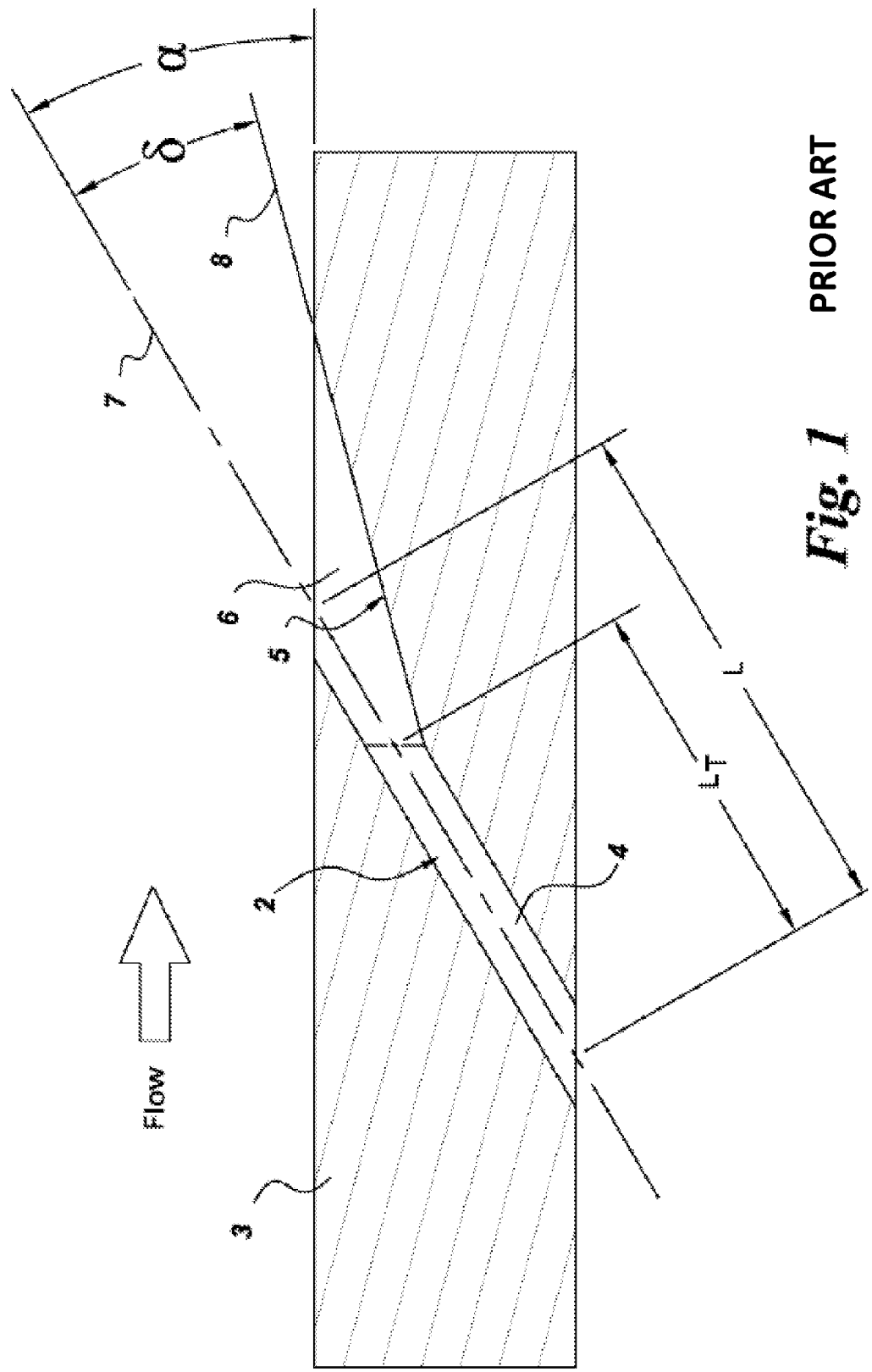
FIG. 1 illustrates a prior art laid back fan diffuser film cooling hole with straight surface facets in the direction of the film hole and flow.
Figure 2:
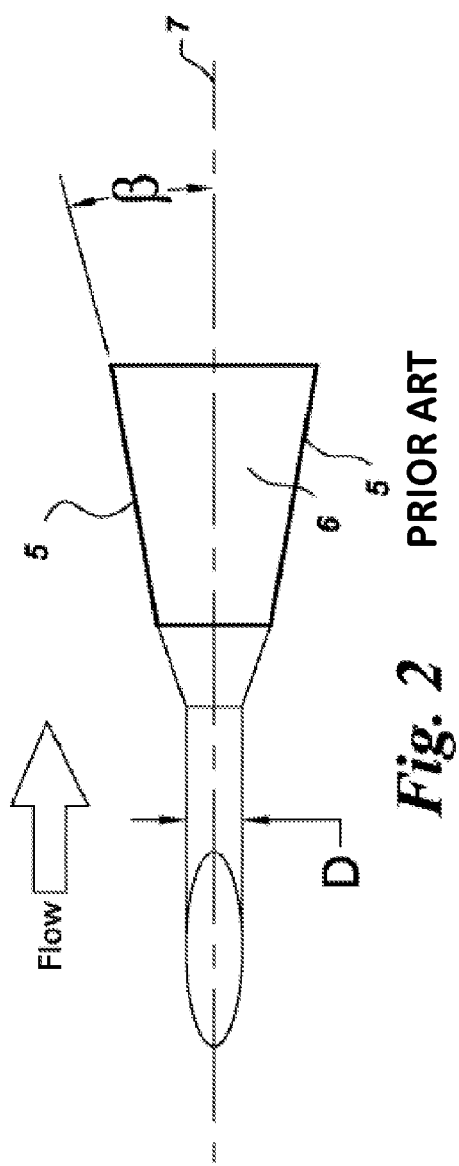
FIG. 2 is a top view projection of the laid back fan diffuser film cooling hole of FIG. 1.
Figure 4:
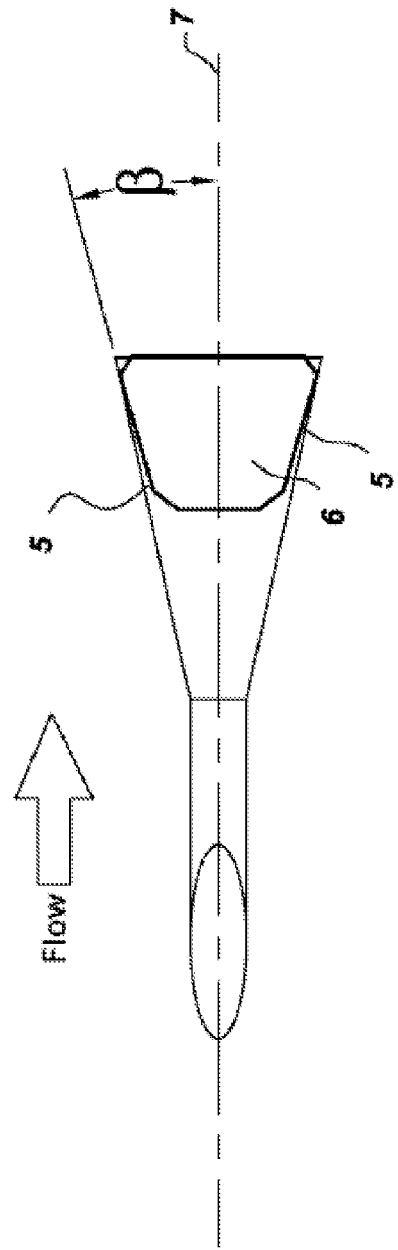
Figure 3:
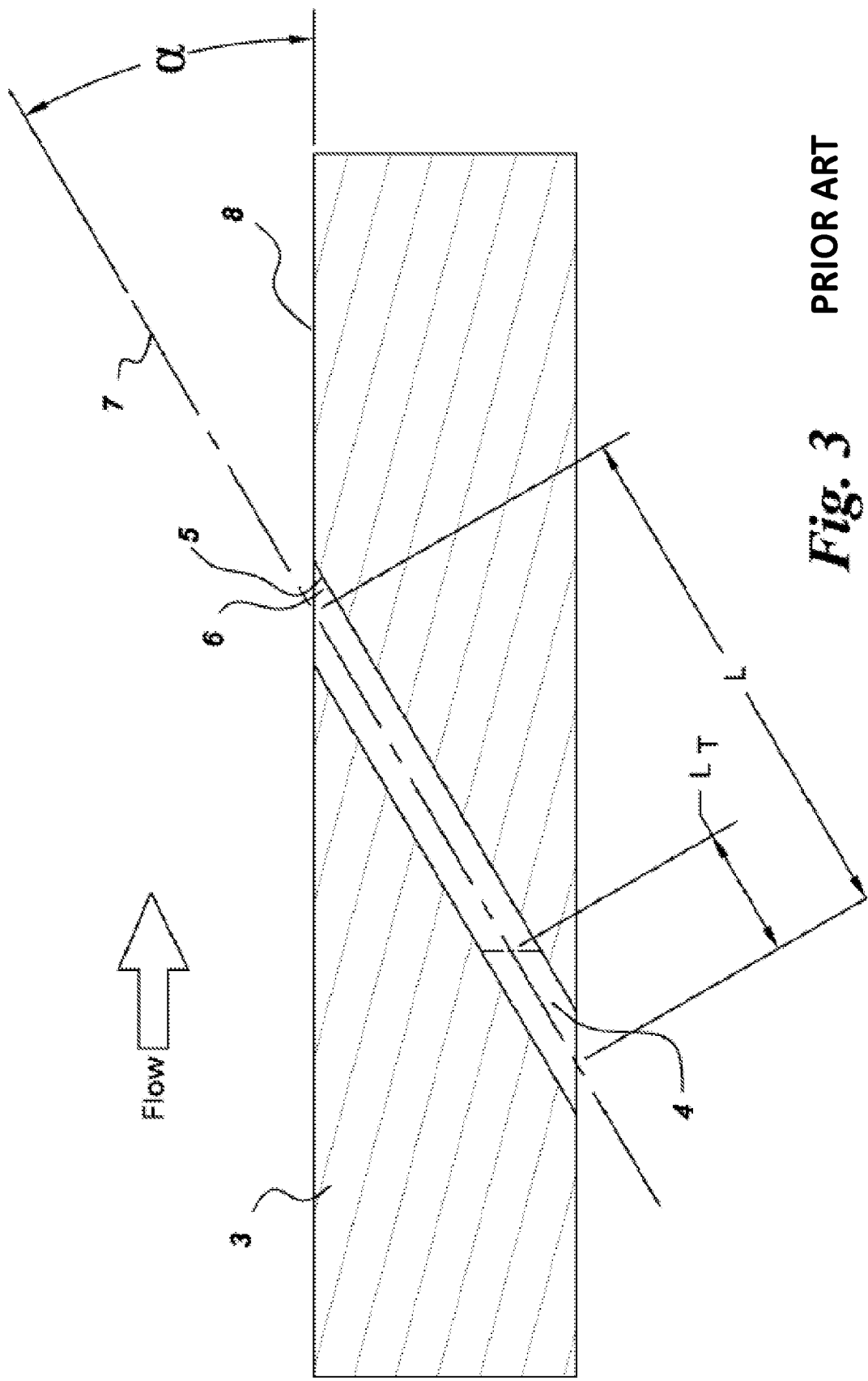
FIG. 3 illustrates a prior art fan diffuser film cooling hole with straight surface facets in the direction of the film hole and flow.
Figure 5:
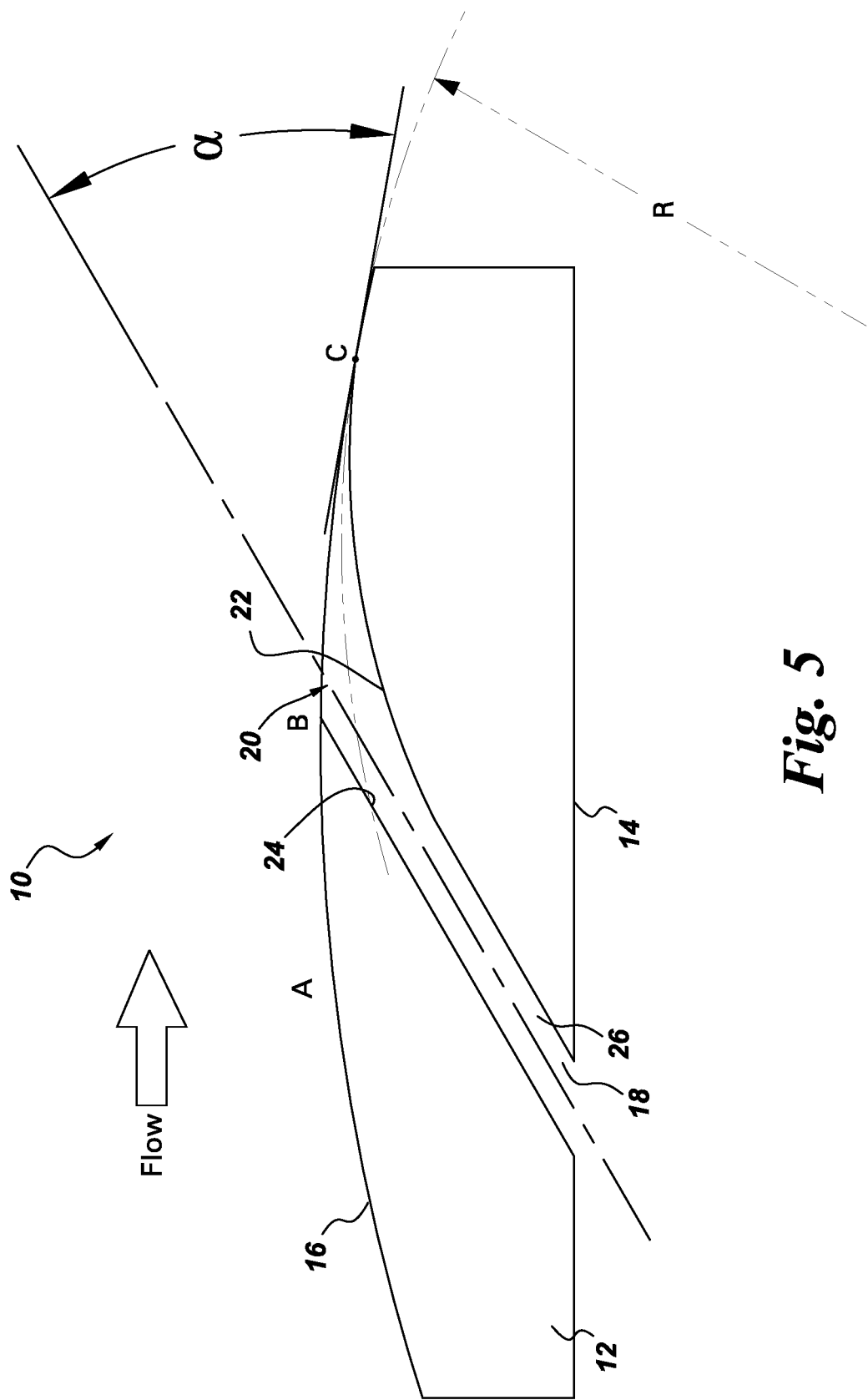
Figure 6:
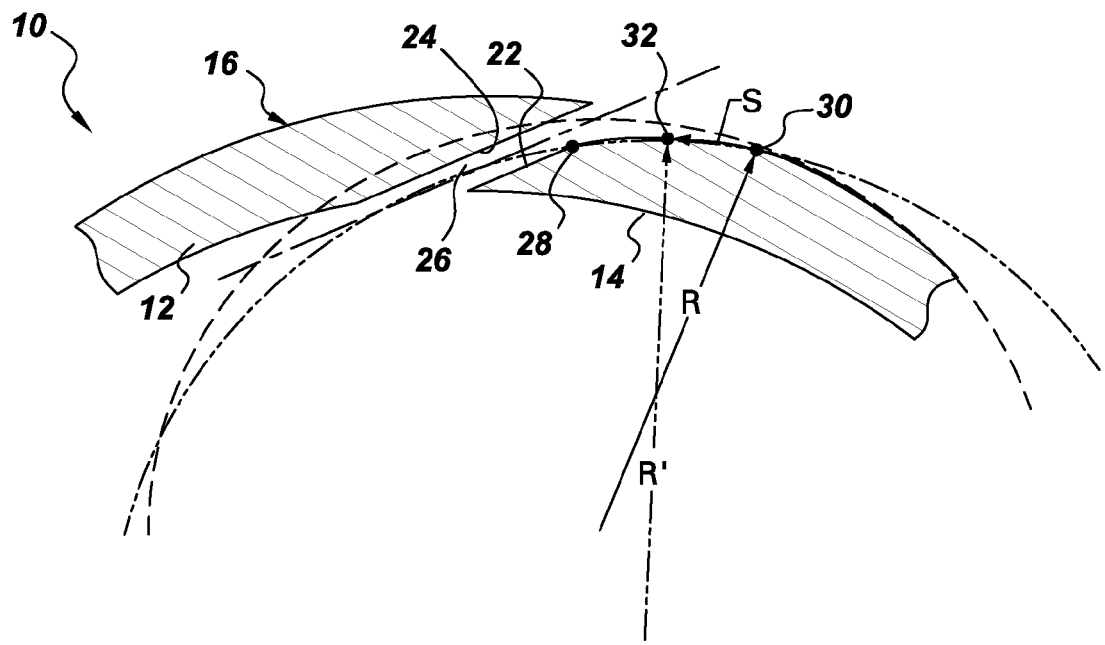
Figure 7:
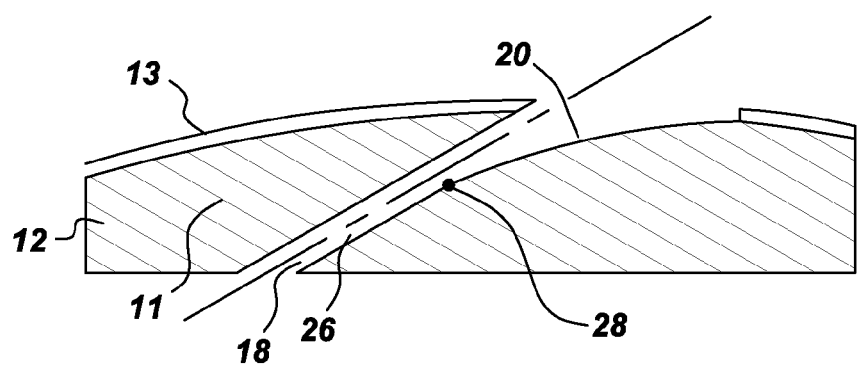
Figure 8:
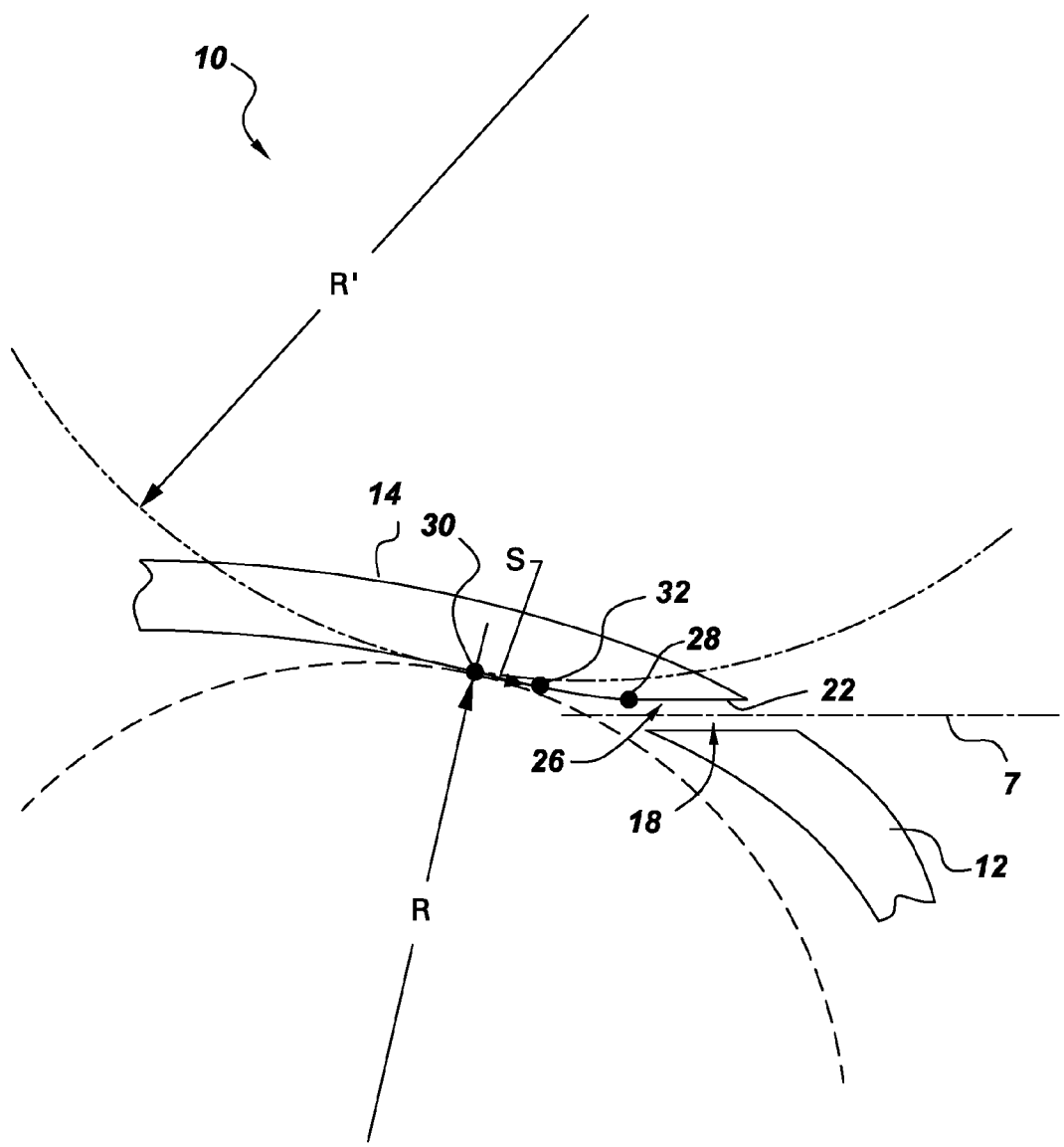
Figure 9:
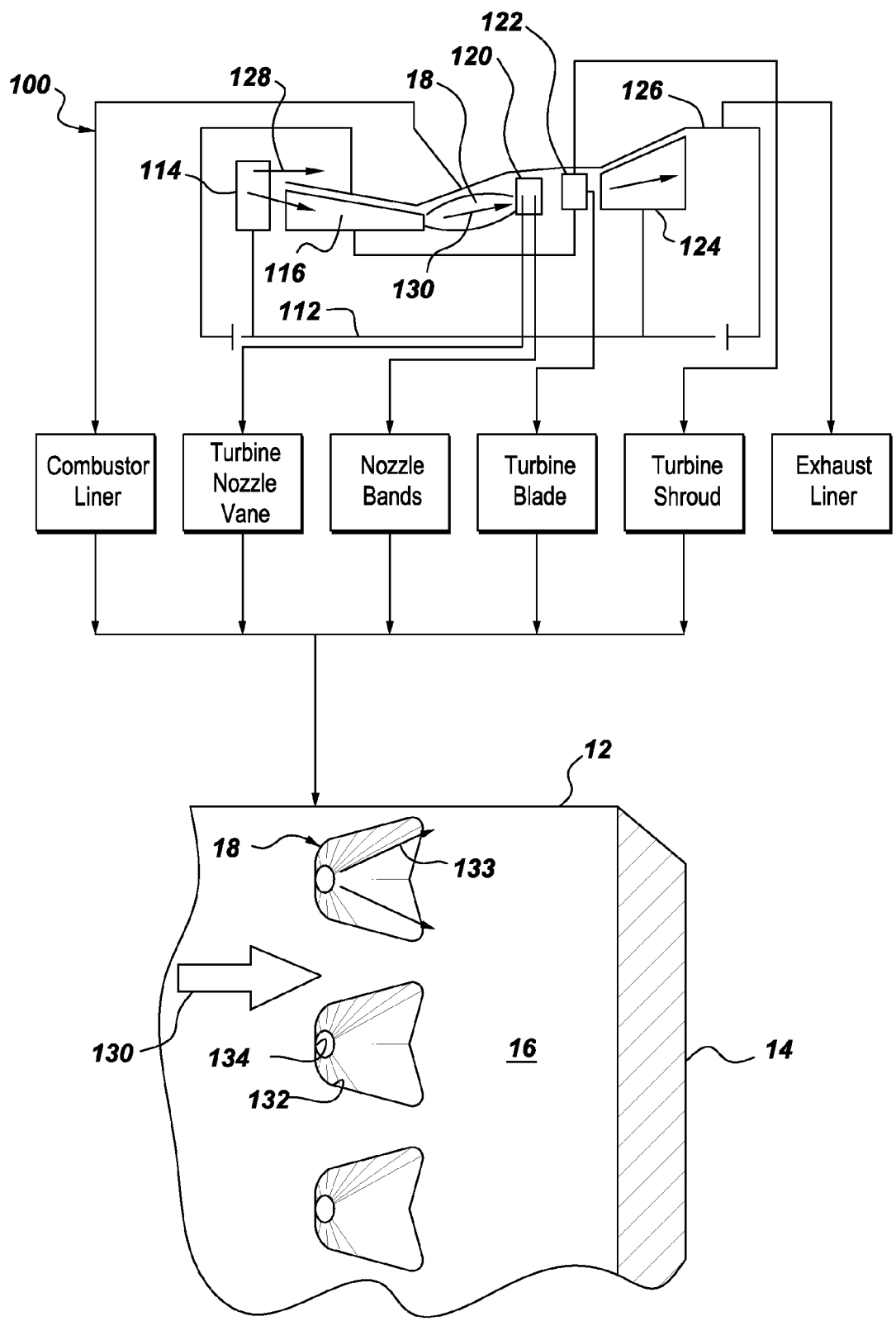
Figure 10:
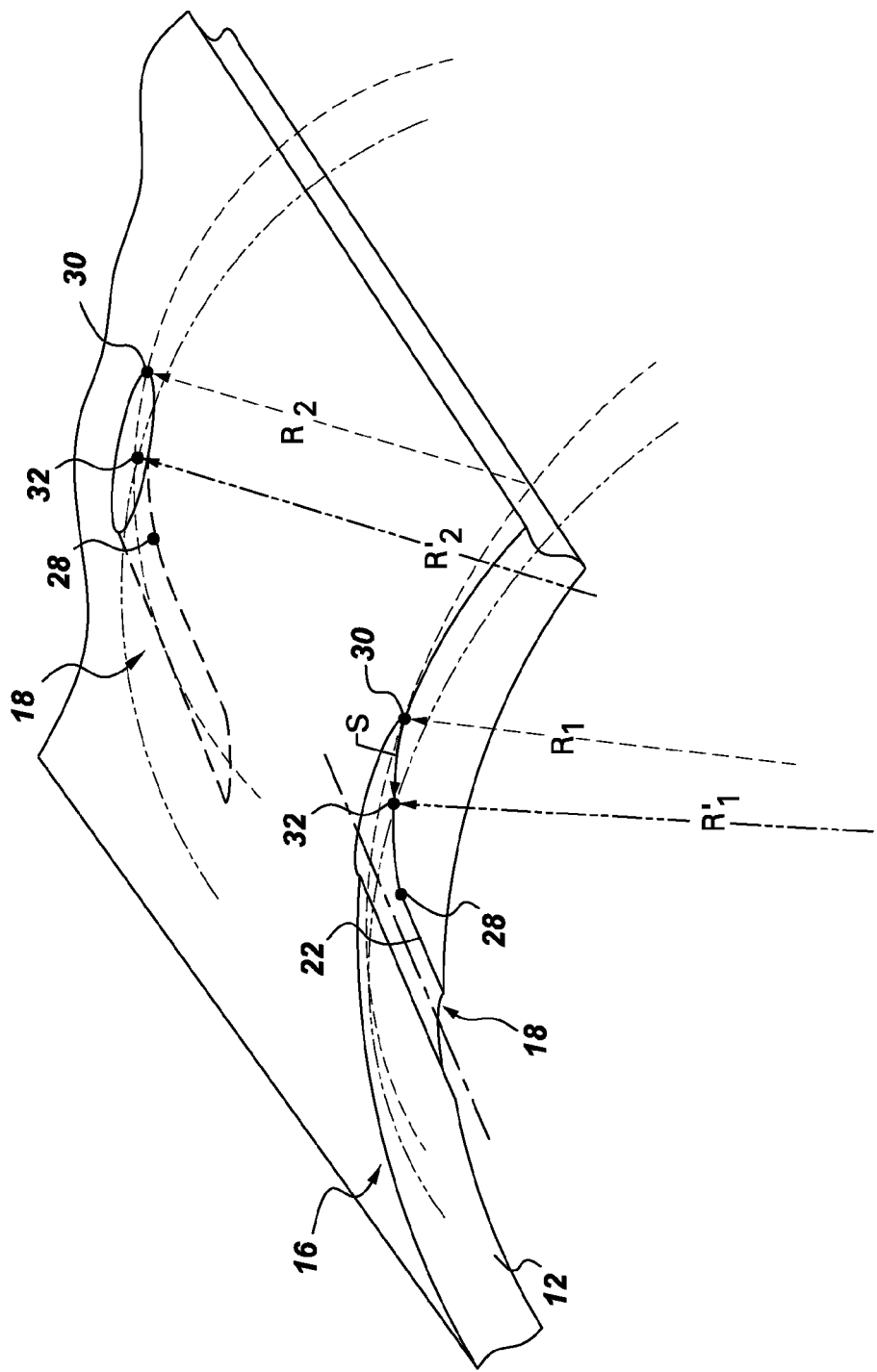
Figure 11:
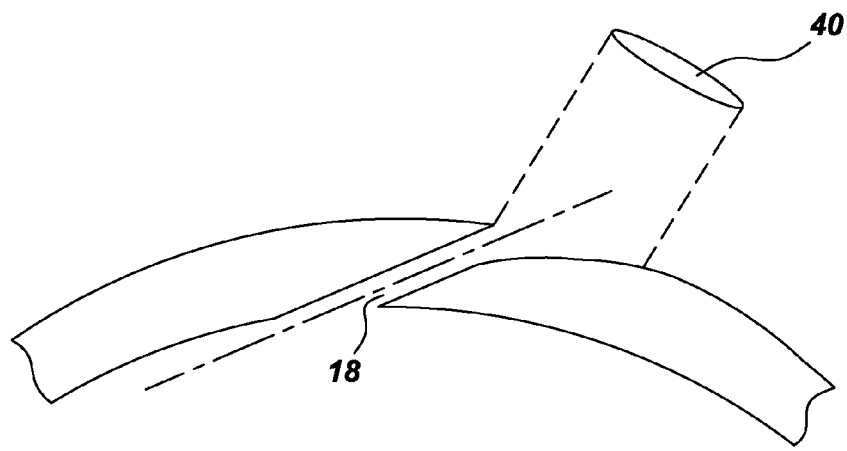
Figure 12:
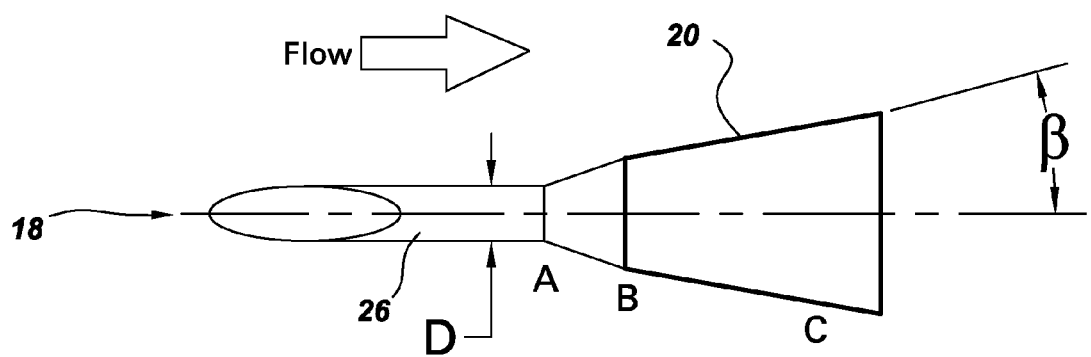

FIG. 4. is a top view projection of the fan diffuser film cooling hole of FIG. 3;

FIG. 5 illustrates a film cooling hole with a curved exit region that conforms to the convex curvature of the outer surface of the component wall, in accordance with aspects of the present invention;

FIG. 6 depicts additional aspects of the film cooling hole of FIG. 5;

FIG. 7 schematically depicts a film cooling hole with a curved exit region formed in a component wall comprising a metal substrate with a protective coating system, in accordance with aspects of the present invention;

FIG. 8 illustrates a film cooling hole with a curved exit region that conforms to the concave curvature of the outer surface of the component wall;

FIG. 9 schematically depicts, in block diagram form, an example gas turbine engine having various components each including a heated wall cooled, at least in part, by a row of film cooling holes;

FIG. 10 illustrates two film cooling holes with curved exit regions that conform to the local convex curvature of the outer surface of the component wall, in accordance with aspects of the present invention;

FIG. 11 schematically depicts a film cooling hole with an elliptical opening; and FIG. 12 is a projection of the film cooling hole shown in FIG. 5, as viewed from the top.

DETAILED DESCRIPTION OF THE INVENTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Illustrated schematically in FIG. 9 is a gas turbine engine 100, which is axisymmetrical about a longitudinal or axial centerline axis 112. The engine includes in serial flow communication a fan 114, multistage axial compressor 116, and an annular combustor 118 followed in turn by a high pressure turbine (HPT) and a low pressure turbine (LPT). The HPT includes a turbine nozzle 120 having a row of hollow stator vanes supported in inner and outer nozzle bands. A first stage turbine 122 follows the first stage turbine nozzle and includes a row of hollow rotor blades extending radially outwardly from a supporting rotor disk and surrounded by an annular turbine shroud. The LPT 124 follows the HPT and includes additional nozzles and rotor blades, which may or may not include internal cooling circuits depending upon the engine design. For the illustrated arrangement, an exhaust liner 126 follows the LPT 124.

During operation, ambient air 128 is pressurized by the fan 114, and the lower portion of which enters the compressor 116 for additional pressurization, while the outer portion is discharged from a fan outlet for providing propulsion thrust in a turbofan engine application. The air pressurized in the compressor is mixed with fuel in the combustor for generating hot combustion gases 130. The combustion gases flow through the various turbine blade stages, which extract energy therefrom for powering the compressor and fan during operation.

It should be noted that the turbofan engine 100 illustrated in FIG. 9 may have any conventional configuration and operation, but is modified as described herein to provide improved film cooling. Any one or more of the various hot gas path engine components disclosed above may be suitably cooled by bleeding a portion of the pressurized air from the compressor 116 during operation.

The hot gas path components typically include a thin wall 12, a portion of which is illustrated in FIG. 9 as representative of the various components of the engine in which film cooling may be utilized. The thin wall 12 may be formed of a conventional superalloy metal, such as a cobalt-based material, having high strength at the elevated temperatures experienced in operation of the gas turbine engine due to heating from the hot combustion gases 130. More generally, any substrate, which is exposed to high temperatures and requires cooling can be used for this invention. Examples include ceramics or metal-based materials. Non-limiting examples of the metals or metal alloys, which might form the thin wall 12 include steel, aluminum, titanium; refractory metals such as molybdenum; and superalloys, such as those based on nickel, cobalt, or iron. The thin wall 12 can also be formed of a composite material, such as a niobium silicide intermetallic composite.

The thickness of the wall 12 will vary, depending on the article in which it is incorporated. In many instances, e.g., for many aviation components, the wall has a thickness in the range of about 0.020 inch to about 0.150 inch (508 microns to about 3810 microns). For land-based components, the wall often has a thickness in the range of about 0.050 inch to about 0.300 inch (1270 microns to about 7620 microns).

For the arrangement shown in FIG. 9, the film cooling holes 18 take the form of chevron film cooling holes 18. However, this is merely one example, and the invention encompasses other film cooling hole configurations, such as diffuser and elliptical arrangements. FIG. 9 illustrates a portion of the component wall 12 in plan view. As shown, the component wall 12 has opposite inner and outer wall surfaces 14, 16. The inner or inboard surface 14 of the wall 12 forms the outer boundary of a suitable cooling circuit provided in the component, which receives air bled from the compressor. The outer surface 16 is exposed to the hot combustion gases 130 during operation and requires suitable film cooling protection. Aspects of the illustrated chevron film cooling holes 18 are discussed below.

The exemplary component wall 12 illustrated in FIG. 9 may be in the form of the inner or outer combustor liners, the turbine nozzle vanes, the turbine nozzle bands, the turbine rotor blades, the turbine shroud, or the exhaust liner, for typical examples, which utilize various forms of film cooling holes therein.

A hot gas path component embodiment of the invention is described with reference to FIGS. 5, 6 and 12. As shown for example in FIG. 5, the component 10 includes at least one wall 12 comprising a first surface 14 and a second surface 16. At least one film cooling hole 18 extends through the wall 12 between the first and second surfaces 14, 16 and has a exit region 20 at the second surface 16 of the component wall 12. As indicated, for example in FIG. 5, the second (exterior) surface 16 of the component wall has a non-planar curvature in the vicinity of the exit region 20, and the film cooling hole 18 is tapered at the exit region 20, such that the curvature of the film cooling hole 18 in the exit region 20 conforms to the non-planar curvature of the second surface 16 of the component wall 12, thereby forming a curved exit region 20. Because the exit region is critical to the overall cooling effectiveness of the film hole, the invention enhances the cooling of the film hole by using a curved surface to define the exit footprint (shape) of the film hole along the flow direction.

For the arrangement depicted in FIG. 5, the film cooling hole 18 has an inboard surface 22 and an outboard surface 24, and the second (exterior) surface 16 of the component wall 12 is convex in the vicinity of the exit region 20. As indicated in FIG. 5, the inboard surface 22 of the film cooling hole 18 is tapered at the exit region 20 to form the curved exit region 20. More particularly, as indicated, for example, in FIGS. 5 and 6, the film cooling hole 20 comprises a straight section 26 and the curved exit region 20. See also, FIG. 12, which is a projection of the film cooling hole shown in FIG. 5, as viewed from the top. Reference letters A, B and C indicate corresponding regions for FIGS. 5 and 12. As indicated in FIG. 6, the transition between the straight section 26 and the curved exit region 20 occurs at a transition point 28. The local radius of curvature R' for the film cooling hole 18 begins to transition from an infinite value to the non-planar curvature of the second (exterior) surface 16 of the component wall 12 in the exit region 20 at the transition point 28. As used here, the term "infinite" should be understood to also encompass very large values corresponding to slight deviations from a perfectly straight inboard surface 22 within the straight section 26 that may occur as a result of the machining process for the straight section 26. According to more particular arrangements, the curved exit region ends at the end point 30 (as indicated in FIG. 6, for example), and the local radius of curvature R' at a given point 32 (as indicated, for example, in FIG. 6) for the film cooling hole 18 transitions from the transition point 28 to the end point 30 according to the equation:

$$R' = FS_{max}[R/(S_{max}-S)], \quad \text{Eq. 1}$$

where F is a scalar adjustment factor, $S_{max}$ is the surface distance between the transition and end points 28, 30, and S is the distance between the end point 30 and the given point 32.

Another example film cooling configuration is illustrated in FIG. 8. For the example arrangement shown in FIG. 8, the film cooling hole 18 has an inboard surface 22 and an outboard surface 24, and the second (exterior) surface 16 of the component wall 12 is concave in the vicinity of the exit region 20. As indicated, for example in FIG. 8, the inboard surface 22 of the film cooling hole 18 is tapered at the exit region 20 to form the curved exit region 20. More particularly, for the example arrangement shown in FIG. 8, the film cooling hole 18 comprises a straight section 26 and the curved exit region 20. As indicated in FIG. 8, the transition between the straight section 26 and the curved exit region 20 occurs at a transition point 28 (as indicated in FIG. 8, for example). As used here, the local radius of curvature R' for the film cooling hole 18 is defined from an exterior of the component (as shown, for example, in FIG. 8). For the arrangement shown in FIG. 8, the local radius of curvature R' for the film cooling hole 18 begins to transition from an infinite value to the non-planar curvature of the second surface 16 of the component wall 12 in the exit region 20 at the transition point 28. According to more particular arrangements, the curved exit region ends at an end point 30, and the local radius of curvature R' at a given point 32 for the film cooling hole 18 transitions from the transition point 28 to the end point 30 according to Equation (1).

Although many of the drawings show only a single cooling hole for ease of illustration, the invention encompasses mul-tiple cooling hole arrangements as well. FIG. 10 illustrates two film cooling holes with curved exit regions that conform to the local convex curvature of the outer surface of the component wall. For this multi-hole arrangement, multiple film cooling holes 18 extend through the wall 12 between the first and second surfaces 14, 16. Similar to the arrangements discussed above with reference to FIGS. 5, 6 and 8, each of the film cooling holes 18 has a respective exit region (indicated by reference numeral 20 in FIGS. 5, 6 and 8) at the second surface 16 of the component wall 12. As indicated in FIG. 10, the non-planar curvature $R_1$, $R_2$ of the second surface 16 of the component wall 12 are different in the vicinity of at least two of the exit regions 20 for the film cooling holes 18. In other words, at least two of the cooling holes have different non-planar curvature values, such that $R_1 \neq R_2$ for at least those two cooling holes. In addition and as indicated in FIG. 10, the respective inboard surfaces 22 of at least two of the film cooling holes 18 are tapered differently, such that the curvatures $R_1'$, $R_2'$ of the respective film cooling holes conform to the respective non-planar curvature $R_1$, $R_2$ of the second surface within the respective curved exit regions 20. One example of this multi-hole, multi-curvature arrangement is shown in FIG. 10, where $R_1 \neq R_2$. For this arrangement, the curvature $R_1$, $R_2$ of the exterior surface 16 of the component wall 12 changes from one location to another on the component 10. Similarly, the curvatures $R_1'$, $R_2'$ of the respective film cooling holes differ as well. (Namely, $R_1' \neq R_2'$ for this arrangement.) Beneficially, this arrangement reduces film blow-off, thereby enhancing the cooling efficiency of the component.

For other multi-hole configurations, multiple film cooling holes 18 extend through the wall 12 between the first and second surfaces 14, 16. Similar to the arrangements discussed above with reference to FIGS. 5, 6 and 8, each of the film cooling holes 18 has a respective exit region 20 at the second surface 16 of the component wall 12. For this particular configuration, the inboard surfaces 22 of the film cooling holes 18 are tapered identically. This arrangement is also illustrated by FIG. 10, for the case of $R_1 = R_2$ and $R_1' = R_2'$.

As discussed above and as schematically depicted in FIG. 7, for many applications the component wall 12 comprises a metal substrate 11. Non-limiting examples of the metals or metal alloys, which might form the thin wall 12 include steel, aluminum, titanium; refractory metals such as molybdenum; and superalloys, such as those based on nickel, cobalt, or iron. For the example configuration illustrated in FIG. 7, the component wall 12 further comprises at least one protective coating 13 disposed on at least a portion of the metal substrate 11. More generally, the component wall 12 includes a protective coating system (which is also indicated by reference numeral 13 in FIG. 7). The protective coating system 13 typically includes multiple coating layers, for example one or more layers of bondcoat and a ceramic coating, such as a thermal barrier coating. Coatings which serve a number of purposes may be used. Frequently, coatings which provide thermal protection, and/or oxidation protection are applied. As one example, a ceramic coating 13 may be applied to the metal substrate 11, e.g., a thermal barrier coating (TBC) formed of a zirconia material such as yttria-stabilized zirconia. In many cases for turbine blades, a bond layer is first applied over the blade surface, e.g., a metal-aluminide or MCrAlY material, where "M" can be iron, nickel, cobalt, or mixtures thereof. For particular configurations, the curved exit region 20 is located in the thermal barrier coating 13. However, for the example arrangement shown in FIG. 7, the curved exit region 20 extends into the substrate 11. For the example arrangement shown in FIG. 7, the film cooling hole 20 comprises a straight section 26 and the curved exit region 20, and the transition between the straight section 26 and the curved exit region 20 occurs at a transition point 28 located in the metal substrate 11, such that the curved exit region 20 extends through the thermal barrier coating 13 into the metal substrate 11.

The film cooling hole 18 may take several forms as discussed below with reference to FIGS. 5, 9, and 11. The lower portion of FIG. 9 is a perspective view of an outer surface of a component wall, illustrating the general exit region of three chevron film cooling holes, which extend through the component wall For the example configuration shown in FIG. 9, each of the film cooling hole 18 comprises a chevron film cooling hole. For the example arrangement of FIG. 9, each film cooling hole 18 extends longitudinally through the wall 12, and diverges both longitudinally along the hole, and laterally across the width of the hole. Thus, each hole extends from an inlet (not shown in FIG. 9) disposed flush at the inner surface 14 of the component wall 12 to a chevron outlet 132 disposed flush at the outer surface 16 of the component wall 12. A portion of the pressurized air from the compressor is directed through chevron film cooling hole 18 as coolant air 133, exiting at the chevron outlet 132. For the illustrated arrangement of FIG. 9, each of the chevron film cooling holes 18 includes an inlet bore 134. The bore usually has a substantially constant flow area from its inlet end to its outlet end. The bore itself can be thought of as the portion of the chevron film cooling hole 18 which remains cylindrical or substantially cylindrical, i.e., prior to the beginning of the chevron outlet. Namely, the inlet bore 134 is analogous to the straight section 26 discussed above with reference to FIGS. 5-8, for example.

For other configurations, each of the film cooling holes 18 comprises a diffuser film cooling hole. FIG. 5 illustrates an example diffuser film cooling hole arrangement.

For certain configurations, each of the film cooling holes 18 has an elliptical opening 40. This arrangement is shown in FIG. 11. For the illustrated arrangement, the film cooling hole 18 is round, such that the opening 40 is elliptic, with the ellipse lengthening as the curvature is followed.

The above-described film cooling holes are particularly useful for curved regions of hot gas path components (such as turbine airfoils) where a straight surface facet (such as those discussed above with reference to FIGS. 1-4) would lead to a high injection angle and significant film blow-off. By using a curved surface to define the exit footprint (shape) of the film hole along the flow direction, the film cooling holes of the present invention provide improved film attachment and hence improved cooling effectiveness.

A method of forming at least one film cooling hole 18 in a component 10 is described with reference to FIGS. 5, 6, 8, and 12. As discussed above with reference to FIG. 5, the component 10 has at least one wall 12 comprising a first surface 14 and a second surface 16. As indicated in FIG. 5, the second surface has a non-planar curvature in the vicinity of the exit region 20 of the film cooling hole 18. The method comprises forming a straight section 26 in the component wall 12, such that the straight section 26 extends through the first surface 14 of the component wall 12, and tapering the film cooling hole 18, such that the curvature of the film cooling hole 18 in the exit region 20 conforms to the non-planar curvature of the second surface 16 of the component wall 12, thereby forming a curved exit region 20 for the film cooling hole 18. These steps may be accomplished using a variety of techniques.

The film cooling holes of the present invention can be formed successfully by several specialized techniques, using selected types of equipment. The techniques can include water jet cutting systems, electric discharge machining (EDM) systems, and laser-drilling systems. Each of these systems is described in commonly assigned U.S. patent application Ser. No. 12/790,675, "Articles which include chevron film cooling holes, and related processes," which is incorporated herein by reference in its entirety.

For certain embodiments, the step of forming the straight section 26 comprises drilling the component wall, wherein the film cooling hole 18 has an inboard surface 22 and an outboard surface 24, and wherein the step of tapering the film cooling hole 20 comprises at least one of: rastering a laser over the inboard surface 18 in the exit region 20, selectively directing an abrasive liquid jet (for example, an abrasive water jet, namely water with abrasive particles dispersed therein) at the inboard surface 18 in the exit region 20, and performing an EDM operation on the inboard surface 18 in the exit region 20.

A number of drilling techniques may be used to form the straight section 26. For example, a laser drilling apparatus may be used. For particular configurations, the laser source generates at least one pulsed laser beam. Such a system is described in commonly assigned, U.S. patent application Ser. No. 12/435,547 (Bunker et al), filed May 5, 2009, which is incorporated herein by reference in its entirety. Typically, the pulsed laser beam may have a pulse duration less than about 50 µs, an energy per pulse less than about 0.1 Joule, and a repetition rate greater than about 1000 Hz. The system may also include a variety of other elements, such as a control subsystem coupled to the laser source that is configured to synchronize the position of the substrate with the pulse duration and energy level. Such a control subsystem is advantageous when forming the film cooling holes and curved exit hole geometries through coatings applied over the substrate.

The present method is particularly useful when the straight section 26 of the film hole 18 is formed by laser drilling. Typically, the use of high-power laser drilling (for example, using millisecond lasers) causes manufacturers to apply film holes at higher than desired angles to the local surface tangent. Accordingly, holes with straight surface facets (such as those discussed above with reference to FIGS. 1-4) have a particularly high injection angle and hence considerable film blow-off. Using a curved surface to define the exit footprint (shape) of the film hole along the flow direction provides significantly improved film attachment relative to conventional straight facet laser drilled cooling holes.

In addition, the straight section 26 of the film cooling hole 18 may be formed using EDM techniques. EDM techniques are known in the art, and described in a number of references, such as U.S. Pat. No. 6,969,817 (Martin Kin-Fei Lee et al), which is incorporated herein by reference in its entirety. The techniques are sometimes referred to as "EDM milling," "spark machining," or "spark eroding." In general, EDM can be used to obtain a desired shape in a substrate or workpiece, by way of a series of rapidly recurring current discharges. The discharges originate between two electrodes, separated by a dielectric liquid, and subject to an electric voltage.

As noted above, film cooling hole may be tapered using a number of techniques, including rastering a laser over the inboard surface 18 in the exit region 20, selectively directing an abrasive liquid jet at the inboard surface 18 in the exit region 20, and performing an EDM operation on the inboard surface 18 in the exit region 20. Suitable laser drilling and EDM systems are described above and discussed in greater detail in previously mentioned U.S. patent application Ser. No. 12/790,675, which also describes a water jet process. As discussed in U.S. patent application Ser. No. 12/790,675, in general, the water jet process utilizes a high-velocity stream of abrasive particles (e.g., abrasive "grit"), suspended in a stream of high pressure water. The pressure of the water may vary considerably, but is often in the range of about 5,000-90,000 psi. A number of abrasive materials can be used, such as garnet, aluminum oxide, silicon carbide, and glass beads. Unlike some of the other cutting processes used on metals, the water jet process does not involve heating of the substrate to any significant degree. Therefore, there is no "heat-affected zone" formed on the substrate surface, which could otherwise adversely affect the desired exit geometry for the passage hole.

The water jet system may include a multi-axis computer numerically controlled (CNC) unit. The CNC systems are known in the art and allow movement of the cutting tool along a number of X, Y, and Z axes, as well as rotational axes.

For the example configuration shown in FIGS. 5, 6 and 12, the second surface 16 of the component wall is convex in the vicinity of the curved exit region 20. For particular arrangements, the step of tapering the film cooling hole 20 further comprises controlling the laser rastering, abrasive liquid jet, or EDM operation, such that the local radius of curvature R' at a given point 32 for the film cooling hole 18 transitions from the transition point 28 to the end point 30 for the curved exit region 20 according to Equation (1).

For the example configuration shown in FIG. 8, the second surface 16 of the component wall is concave in the vicinity of the curved exit region 20. For particular arrangements, the step of tapering the film cooling hole 20 further comprises controlling the laser rastering, abrasive liquid jet, or EDM operation, such that the local radius of curvature R' at a given point 32 for the film cooling hole 18, which is defined from the exterior of the component (as shown, for example, in FIG. 8), transitions from the transition point 28 to an end point 30 for the curved exit region 20 according Equation (1).

In addition to their enhanced cooling effectiveness, the film cooling holes of the present invention offer additional benefits relative to conventional straight facet cooling holes. To reduce film blow off, placement of conventional film holes on hot gas path components is currently limited by airfoil curvature. Namely, conventional film holes are typically placed in areas with relatively low airfoil curvature to reduce film blow-off. However, it is often desirable to include film cooling on high curvature portions of a hot gas path component. Beneficially, because exit regions of the film cooling holes 18 conform to the surface curvature of the component (for example, airfoil or endwall), the holes can be placed in regions of high airfoil (or endwall) curvature.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming at least one film cooling hole in a component having at least one wall comprising a first surface and a second surface, wherein the second surface has a non-planar curvature in a vicinity of an exit region of the film cooling hole, the method comprising:
    forming a straight section in the component wall, such that the straight section extends through the first surface of the component wall; and
    tapering the film cooling hole, such that a curvature of the film cooling hole in the exit region conforms to the non-planar curvature of the second surface of the component wall, thereby forming a curved exit region for the film cooling hole,
    wherein the step of forming the straight section comprises drilling the component wall, wherein the film cooling hole has an inboard surface and an outboard surface, and wherein the step of tapering the film cooling hole comprises at least one of:
        rastering a laser over the inboard surface in the exit region,
        selectively directing an abrasive liquid jet at the inboard surface in the exit region, and
        performing an electrical discharge milling (EDM) operation on the inboard surface in the exit region; and
    wherein the second surface of the component wall is convex in the vicinity of the curved exit region, and wherein the step of tapering the film cooling hole further comprises controlling the laser rastering, abrasive liquid jet, or EDM operation such that the local radius of curvature R' at a given point for the film cooling hole transitions from the transition point to an end point for the curved exit region according to the equation $R'=FS_{max}[R/(S_{max}-S)]$, where F is a scalar adjustment factor, $S_{max}$ is a surface distance between the transition and end points and S is a distance between the end point and the given point.

2. A method of forming at least one film cooling hole in a component having at least one wall comprising a first surface and a second surface, wherein the second surface has a non-planar curvature in a vicinity of an exit region of the film cooling hole, the method comprising:
    forming a straight section in the component wall, such that the straight section extends through the first surface of the component wall; and
    tapering the film cooling hole, such that a curvature of the film cooling hole in the exit region conforms to the non-planar curvature of the second surface of the component wall, thereby forming a curved exit region for the film cooling hole,
    wherein the step of forming the straight section comprises drilling the component wall, wherein the film cooling hole has an inboard surface and an outboard surface, and wherein the step of tapering the film cooling hole comprises at least one of:
        rastering a laser over the inboard surface in the exit region,
        selectively directing an abrasive liquid jet at the inboard surface in the exit region, and
        performing an electrical discharge milling (EDM) operation on the inboard surface in the exit region; and
    wherein the second surface of the component wall is concave m the vicinity of the curved exit region, and wherein the step of tapering the film cooling hole further comprises controlling the laser rastering, abrasive liquid jet, or EDM operation such that the local radius of curvature R' at a given point for the film cooling hole, which is defined from an exterior of the component, transitions from the transition point to an end point for the curved exit region according to the equation $R'=FS_{max}[R/(S_{max}-S)]$, where F is a scalar adjustment factor, $S_{max}$ is a surface distance between the transition and end points and S is a distance between the end point and the given point.

* * * * *